(12) United States Patent
Stocchiero (10) Patent No.: US 6,782,605 B1
(45) Date of Patent: Aug. 31, 2004

(54) ACCUMULATOR FORMING INSTALLATION (76) Inventor: Franco Stocchiero, Via Giacomo Zanella, 34-36050 Montorso Vicentino (VI) (IT)

( * ) Notice: Subject to any disclaimer, the term of this patent is extended or adjusted under 35 U.S.C. 154(b) by 162 days.

(21) Appl. No.: 10/110,529
(22) PCT Filed: Nov. 14, 2000
(86) PCT No.: PCT/EP00/11226
§ 371 (c)(1), (2), (4) Date: Apr. 15, 2002
(87) PCT Pub. No.: WO01/37363
PCT Pub. Date: May 25, 2001

(30) Foreign Application Priority Data

Nov. 19, 1999 (IT) .......................................... VI99A0235

(51) Int. Cl.[7] .............................................. B23P 15/00
(52) U.S. Cl. .............................. 29/726; 29/799; 29/730; 29/623.1
(58) Field of Search ....................... 29/799, 730, 623.1, 29/890.06

(56) References Cited

U.S. PATENT DOCUMENTS

| 3,816,898 A | * | 6/1974 | Odman ......................... 29/730 |
| 3,908,738 A | * | 9/1975 | Bruzas et al. .................. 164/80 |
| 5,407,450 A | * | 4/1995 | Rose et al. .................... 29/730 |
| 5,439,488 A | * | 8/1995 | Audit et al. ................... 29/730 |
| 5,803,933 A | * | 9/1998 | Kilb ........................... 29/623.1 |
| 2003/0037431 A1 | * | 2/2003 | Benson et al. ............. 29/623.1 |

FOREIGN PATENT DOCUMENTS

| EP | 0406464 | 9/1991 |
| JP | 10106614 | 4/1998 |

* cited by examiner

Primary Examiner—Irene Cuda-Rosenbaum
(74) Attorney, Agent, or Firm—Dykema Gossett PLLC (57) ABSTRACT

An installation for manufacturing accumulators employs a plurality of pallets for supporting the accumulators, a loading station (3), an unloading station (4), a power supply (5), and an electrolyte feeder (6). A casing (7) with projecting supports (8) is positioned side by side and aligned in vertical direction for supporting the pallets to create the same number of accumulator (A) manufacturing stations, and a handler (10) moves the pallets (2).

19 Claims, 8 Drawing Sheets

ACCUMULATOR FORMING INSTALLATION

BACKGROUND OF THE INVENTION

The invention concerns an installation for manufacture of accumulators, particularly suitable for the rapid manufacture of lead accumulators.

The manufacture of accumulators has to be understood in terms of charging them before use.

According to known installations, a plurality of accumulators are placed on roller support surfaces that make it possible to move them along the production line.

In particular, in a first type of installation, the accumulators reach a first filling 10 station, where the electrolyte is fed into the accumulator.

Successively, an operator connects the poles of each accumulator to an electric network that, powered by a suitable power unit, supplies the electric energy that is necessary to charge the accumulators.

After the charging phase, which lasts from 18 to 24 hours in total, an operator disconnects the accumulators from the electric network and conveys them to a second filling station, where each accumulator is emptied and is then refilled with electrolyte with final density.

Another known type of installation features the forced circulation of the electrolyte inside the accumulator, during the charging phase. This ensures considerable reduction in accumulator charging time, provided that some parameters like the density and temperature of the acids are kept constant.

It is important to consider that the complex electric and hydraulic networks constituting the installation make it necessary to operate on a substantially horizontal plane.

The main drawback of the described installations is represented by the fact that, being substantially developed on a horizontal plane, they occupy large surfaces, which considerably influences the implementation and maintenance costs of the installation itself.

In particular, the cost of the racks constitutes a considerable share of the total expenses required for the implementation of the structure.

Another drawback is represented by the fact that the operators inhale noxious substances deriving from the evaporation of the acid solutions present inside the accumulator.

SUMMARY OF THE INVENTION

The aim of the present invention is to overcome the above mentioned drawbacks.

One of the first goals of the invention is the implementation of an accumulator manufacturing installation that, though maintaining the number of accumulators treated at the same lime unchanged, should occupy a quite smaller surface than the known installations, thus reducing the installation costs considerably.

A further aim is the implementation of an installation that should make it possible to reduce the necessary personnel, though maintaining the same productivity as the known installations.

Another aim of the present invention is that the installation, during the forming of the elements, should make it possible to control the noxious gases developed during the process in the best possible way, so that the operators in charge with the installation don't have any contact with these gases.

The present invention is also aimed at implementing a modular installation that may be adapted and enlarged according to the needs.

The aims mentioned above have been achieved through the implementation of an installation for manufacturing accumulators including:

- a plurality of pallets, each for supporting a plurality of accumulators aligned side by side;
- at least one loading station to place said accumulators on a pallet;
- at least one unloading station for the receiving of the accumulators from the pallet;
- power supply means for feeding said accumulators to be formed;
- electrolyte feeding means for filling the accumulators including:
- a casing having a plurality of projecting supports positioned side by side and aligned in vertical direction, for supporting said pallets in a substantially horizontal position, one on top of the other, in such a way as to create a number of manufacturing stations;
- handling means for moving said pallets among said loading and unloading stations and said manufacturing stations.

The invention makes it possible to considerably increase the productivity of the accumulator manufacturing process compared with the known installations.

Another to advantage of the invention is the introduction of a continuous accumulator production line.

The invention makes it possible to improve the filling process, thus reducing production times.

BRIEF DESCRIPTION OF THE DRAWINGS

The aims and advantages described above will be highlighted in greater detail in the description of one among many possible applications of the invention in question, illustrated in the attached drawings, wherein.

FIGS. from 6 to 9 represent some operating phases of the installation of FIG. 1.

DESCRIPTION OF THE INVENTION

Figure 1:
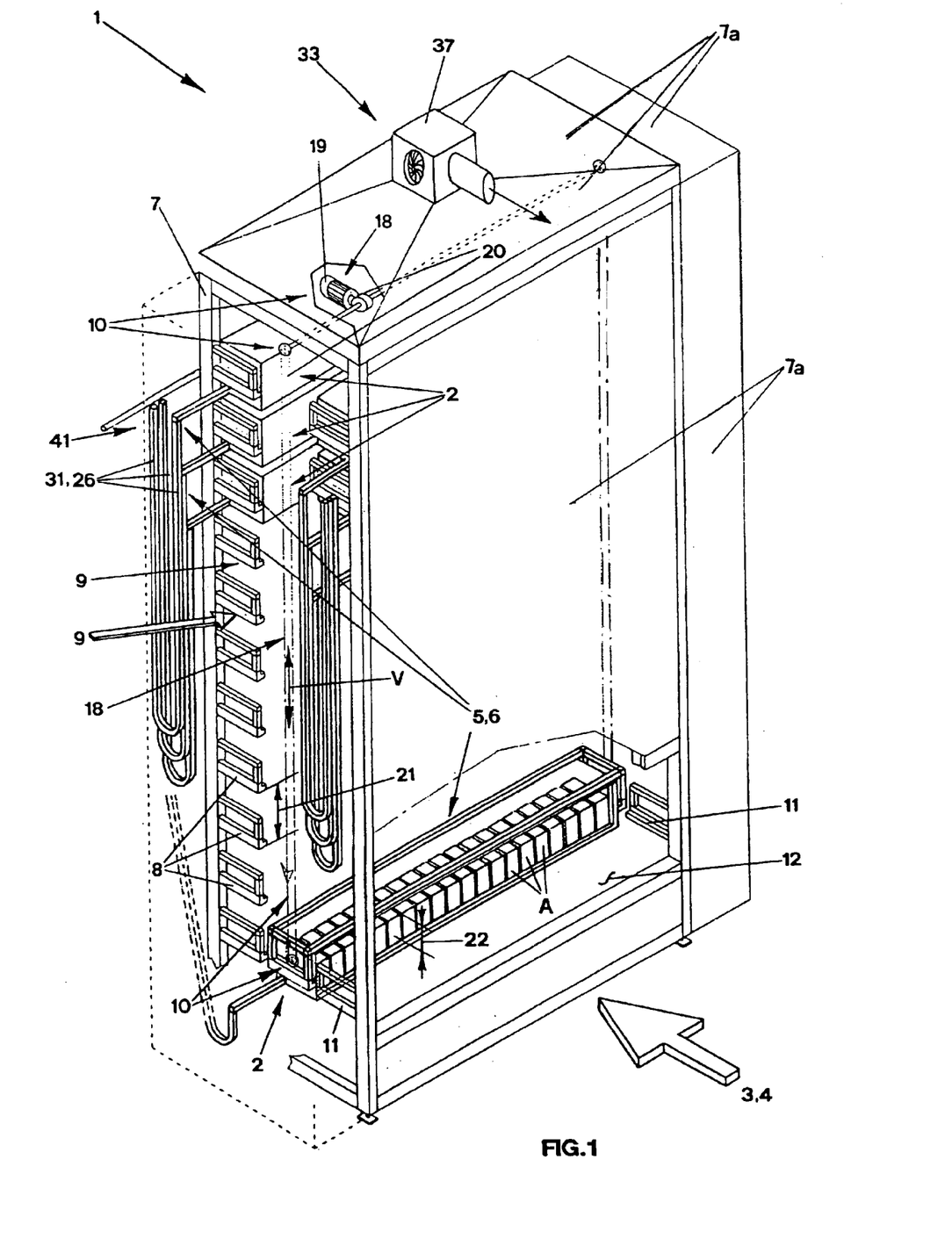
FIG. 1 is an axonometric view of the accumulator forming installation subject of the present invention.

The accumulator manufacturing installation 1 of the invention in FIG. 1, comprises a plurality of pallets 2 on/from which the accumulators A to be formed are placed/collected in correspondence with the loading/unloading stations 3 and 4, power supply means 5 and electrolyte feeding means 6 for the accumulators A to be manufactured.

The invention comprises a casing 7 provided with a plurality of projecting supports 8 positioned side by side and aligned in vertical direction, suitable for supporting the pallets 2 by placing them one on top of the other, in such a way as to create the same number of manufacturing stations 9 for the accumulators A to be formed, and handling means 10, for moving the pallets 2 among the loading and unloading stations 3 and 4 and the manufacturing stations 9.

In particular, in the example described herein, the loading station 3 and the unloading station 4 coincide and are defined by the pair of lower projecting supports 11 arranged on the two sides of the casing 7 and by the plane 12 situated between them.

In each one of said pallets 2 the power supply means 5 and the electrolyte feeding means 6 are positioned, as shown in detail in FIG. 2, below the ideal line, indicated by 8L, along which each pallet 2 is suspended from the respective projecting supports 8 and handling means 10.

Figure 2:
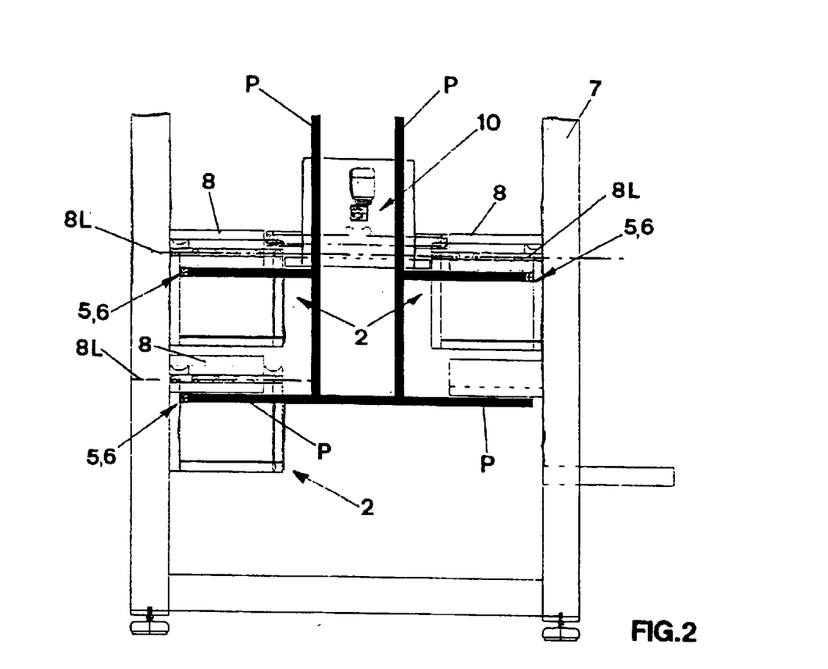
FIG. 2 is a side view of the installation shown in FIG. 1.

In this manner special routes shown in FIG. 2 and indicated by P are created, which are free from hindrances and ensure the continuous feeding of the accumulators A, even during the handling phases of the pallets 2.

Figure 3:
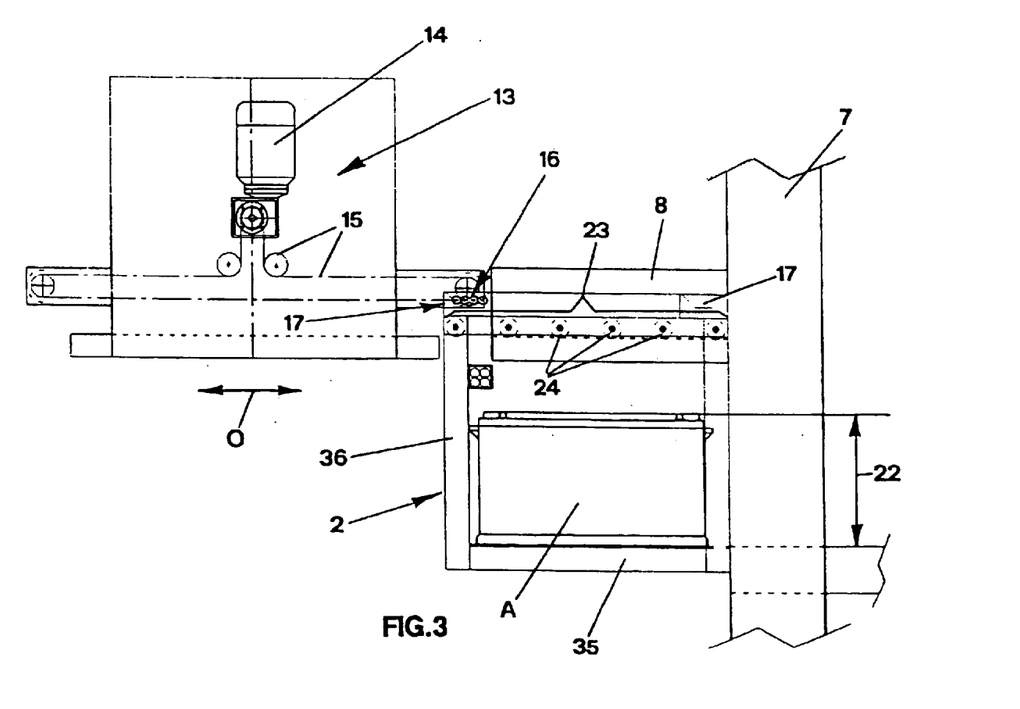
FIG. 3 is a partial side view of a detail of the installation shown in FIG. 1.

The handling means 10 comprises travel means 13, visible in detail in FIG. 3, and lifting means 18, visible in detail in FIG. 1. In particular, the travel means 13 comprises first powering means 14 and first kinematic units 15 provided with coupling means 16 suitable for mating to second coupling means 17 present on each pallet 2, in order to ensure the coupling and the successive shifting of the pallet 2 along the horizontal direction O. The lifting means 18 comprises second powering means 19 and second kinematic units 20 that permit the movement of each pallet 2 along the vertical direction V.

It is important to consider that the pallets 2 are vertically spaced from one another by a distance 21 that cannot be shorter than the height 22 of the accumulators A supported by each pallet.

It is also important to observe that each pallet 2, as it can be seen in FIG. 3, is provided with sliding means 23, for facilitating its movement towards or away from the loading/unloading stations 3 and 4 and towards or away from each projecting support 8. The sliding means 23 includes idle rollers 24, and according to a variant application of the invention, can be present on the projecting supports 8 or on the handling means 10 or on both of them.

Figure 4:
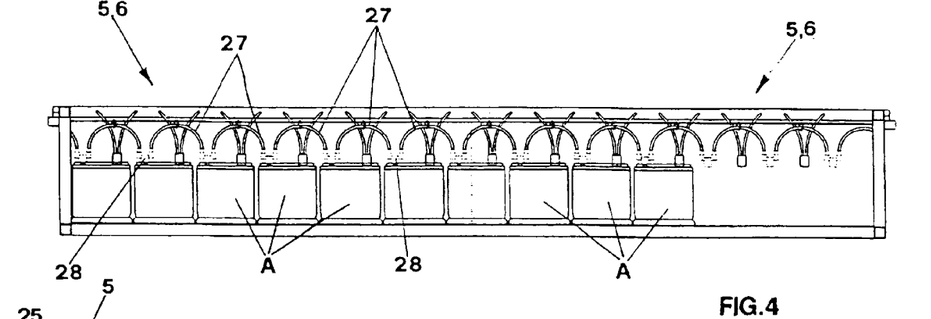
FIG. 4 is a side view of an element of the installation of FIG. 1.
Figure 5:
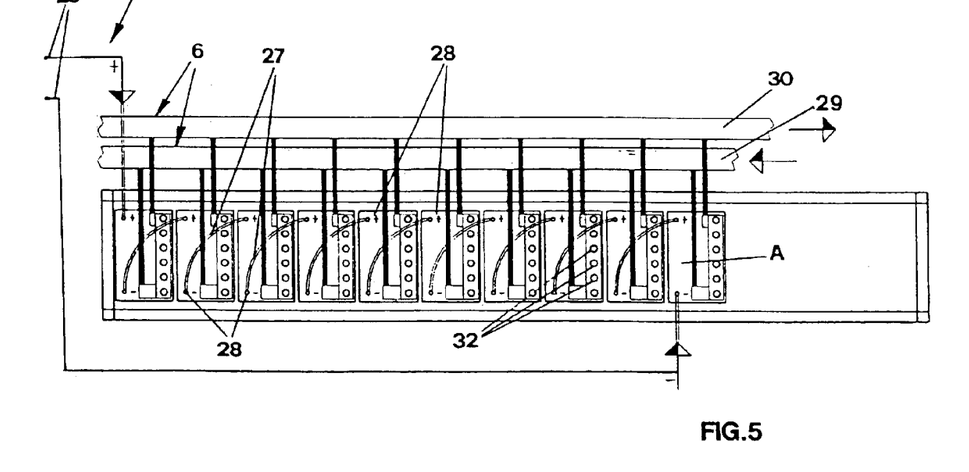
FIG. 5 is a plan view of the element of FIG. 4.
Figure 6:
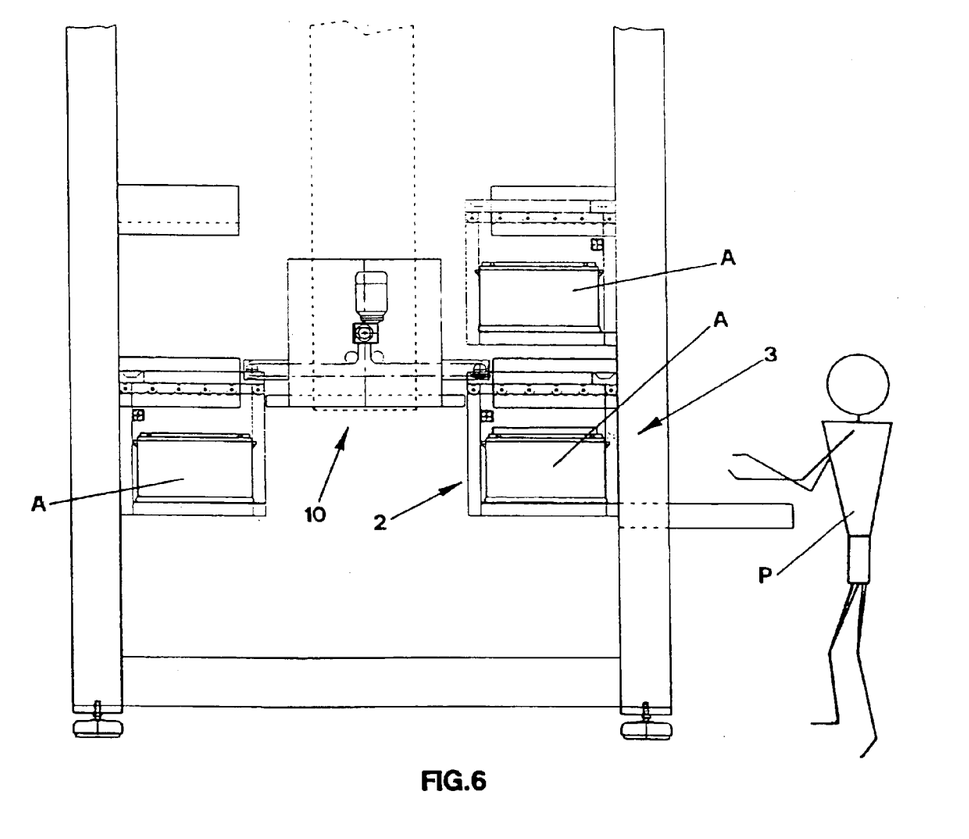

The power supply means 5 shown in detail in FIGS. 4 and 5, comprises a collector cable 25 integral with each pallet 2 and connected, by means of a flexible cable 26 (FIG. 1), to a continuous power unit not shown and provided with a plurality of electric terminals 27 with removable connectors 28 for the connection to the respective poles, positive and negative, of each one of the accumulators A to be manufactured.

The removable connectors 28 connect the accumulators A to be manufactured preferably, but not necessarily in series.

The electrolyte feeding means 6, shown in FIGS. 4–5 comprise two manifolds for the feeding and return of the electrolyte, indicated respectively by 29 and 30, each one integral with each pallet 2 and connected, through the same number of flexible pipes 31 shown in FIG. 1, to a feed and return unit (not shown).

The feed and return unit provides for the forced circulation of the electrolyte inside each accumulator A, as required by the manufacturing and charging process, also preventing the accumulation of hydrogen. It is well known, in fact, that during the forming process hydrogen is developed, which is highly flammable if present in the atmosphere in a percentage exceeding 4%.

Each manifold 29 and 30 is also provided with a plurality of pipes connected to the same number of filling elements 32 that can be removably connected to the filling holes of each accumulator to be formed A. Each filling element 32 is known.

The pallets 2, comprise a support surface 35 for the accumulators A to be formed. The support surface being developed longitudinally and is visible in FIG. 3. Said surface 35 is supported at the ends by a substantially U-shaped bearing structure 36, in which the second coupling means 17 is provided and which supports the collector cable 25 and the two manifolds 29 and 30.

As shown in FIG. 1, the installation is provided with suction means 33, for the gases developed in each accumulator, comprising in particular an aspirator 37 positioned above the casing 7.

The suction means 33 is necessary, since it permits the elimination of any toxic vapours that may be inhaled by the operator in charge with the installation. The suction is more effective thanks to the presence of a plurality of panels 7a positioned on the casing perimeter and surrounding the installation.

An automatic fire fighting system, (not shown), may be placed inside said space, and it should preferably be of the type with chemical extinguisher.

It must also be observed that either the flexible cable 26 and the flexible pipes 31 are supported by a releasing/retrieving unit 41 in FIG. 1.

From an operational point of view, the installation is designed so that the accumulators A to be manufactured coming from the assembly line reach the loading station 3, for example by means of a conveyor belt. An operator P places them on the pallet 2, connects each removable connector 28 to the corresponding poles of each accumulator A and inserts the filling element 32 in the corresponding electrolyte filling holes of each accumulator A, thus guaranteeing the supply of power and electrolyte.

Figure 7:
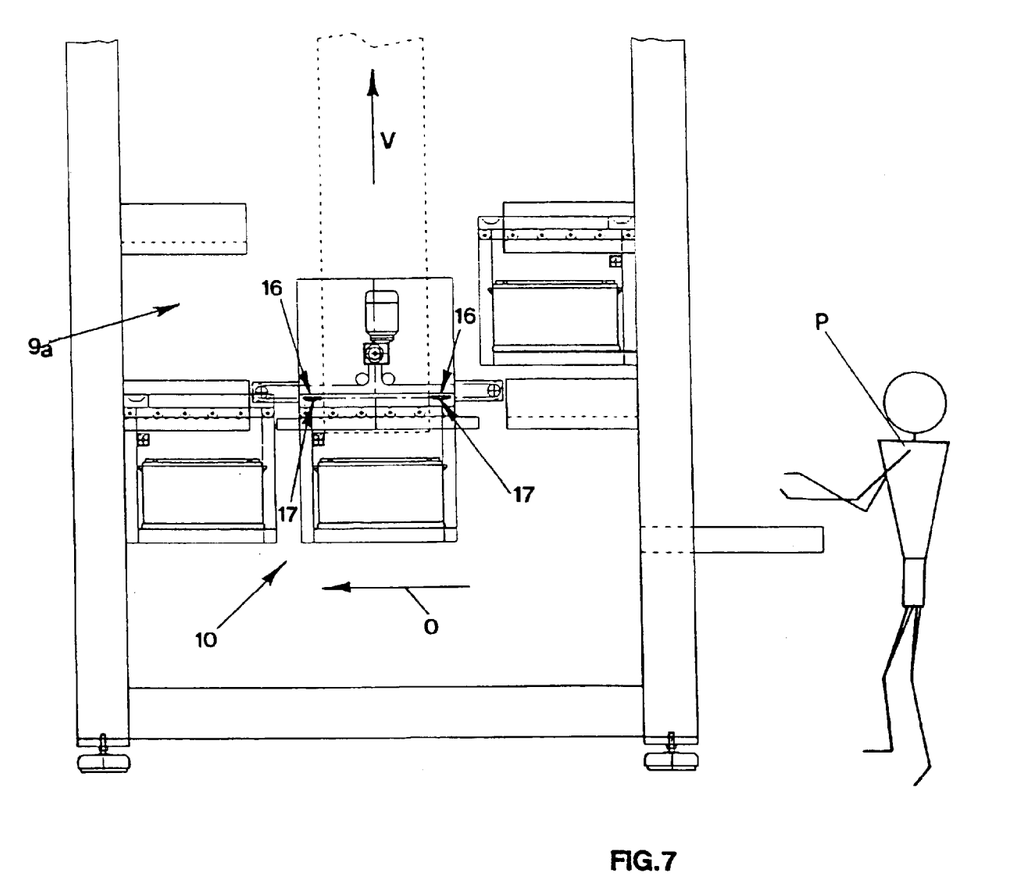
Figure 8:
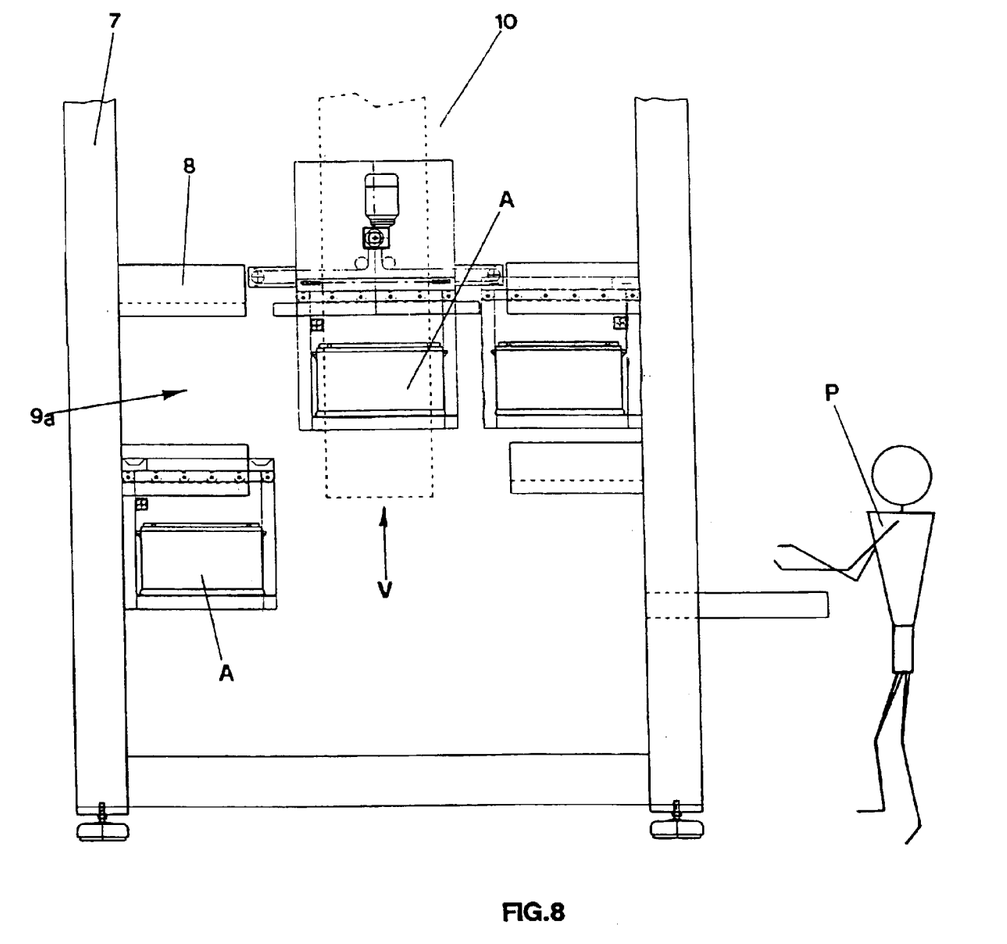

Successively the operator P, through a control panel (not shown) operates the handling means 10, which first move near the loading station 3 and then collect the pallet 2 through the mating of the first coupling means 16 and second coupling means 17, to convey said pallet 2 to a free forming station 9a, as shown in FIGS. 7 and 8.

Figure 9:
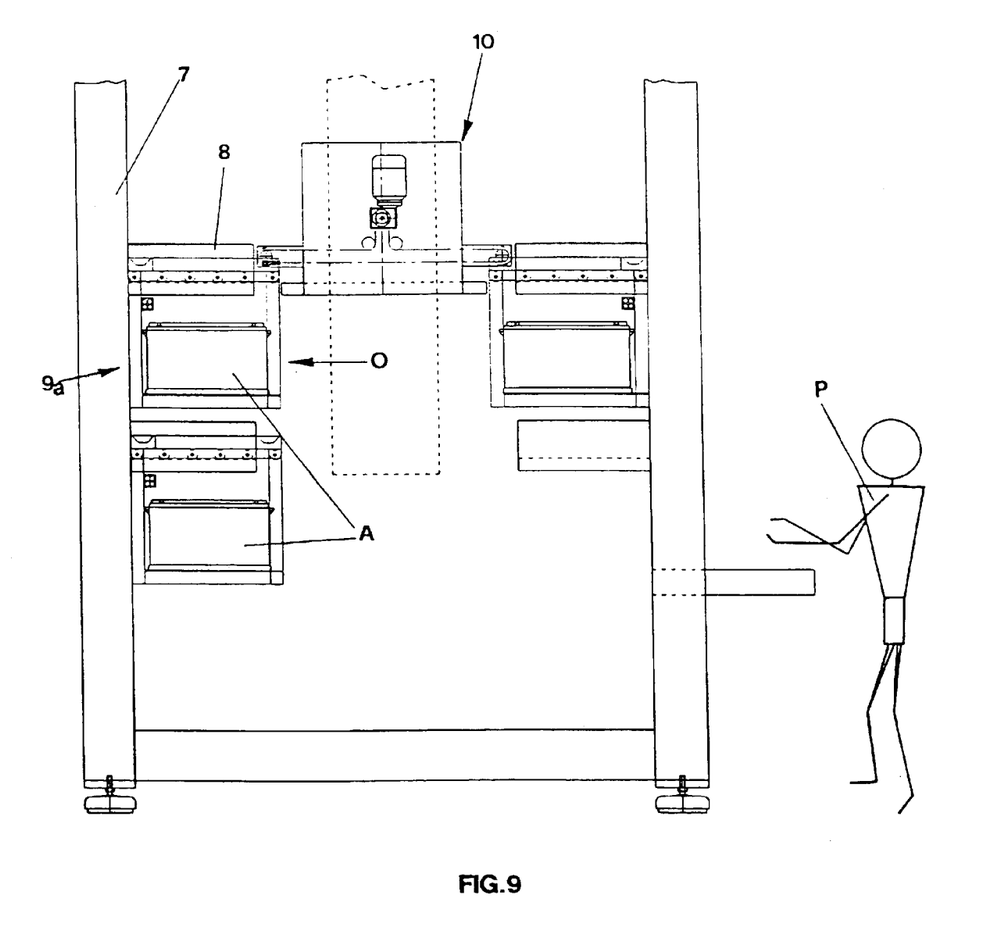

Once the free forming station 9a has been reached, the travel means 13 automatically provides for shifting the pallet 2 horizontally and placing it in the free forming station 9a, as shown in FIG. 9.

The accumulators A to be manufactured being positioned on the respective manufacturing stations 9 undergo a filling, forming and charging cycle, after which, with a procedure similar to that described above, but performed in the reverse order, are collected from each forming station and brought to the unloading station 4, where the operator removes them.

In particular, the cycle of the accumulators A to be formed positioned on each manufacturing station 9 is controlled by an intelligent unit, (not shown), which provides for coordination of the travel means 13 and lifting means 18 and controls the operation of the suction installation and the capacity of the electrolyte feeding installation and of the power supply installation.

Figure 10:
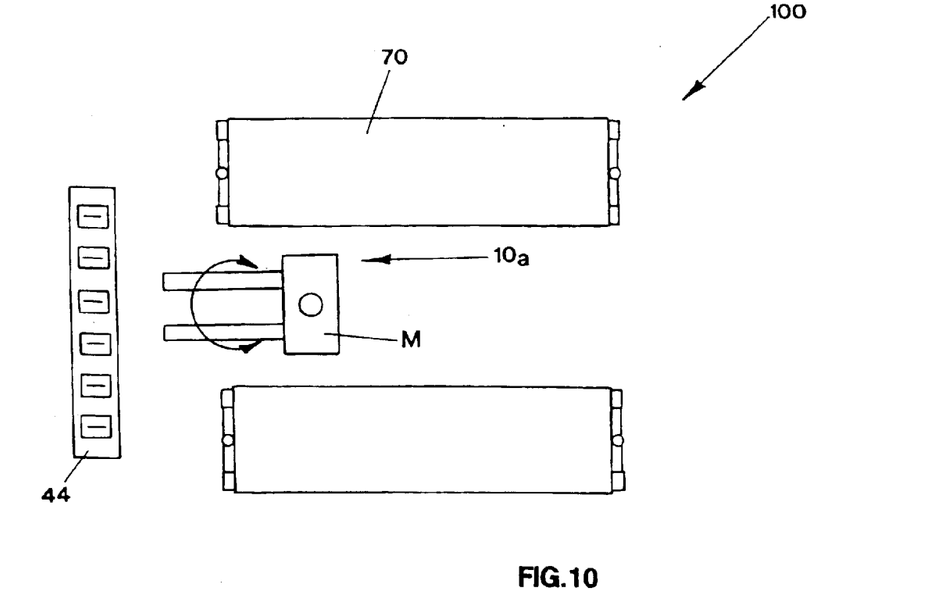
FIG. 10 is a plan view of a variant application of the installation of FIG. 1.

A variant application of the described installation is represented in FIG. 10, where it is indicated as a whole by 100, is differentiated from the previous one by the fact that the handling means do not belong to the casing 7.

In particular, said handling means 10a comprises a trilateral forklift M that makes it possible to collect the accumulators, previously positioned side by side on a surface 44, and then places them on each forming station defined by the casings 70.

Figure 11:
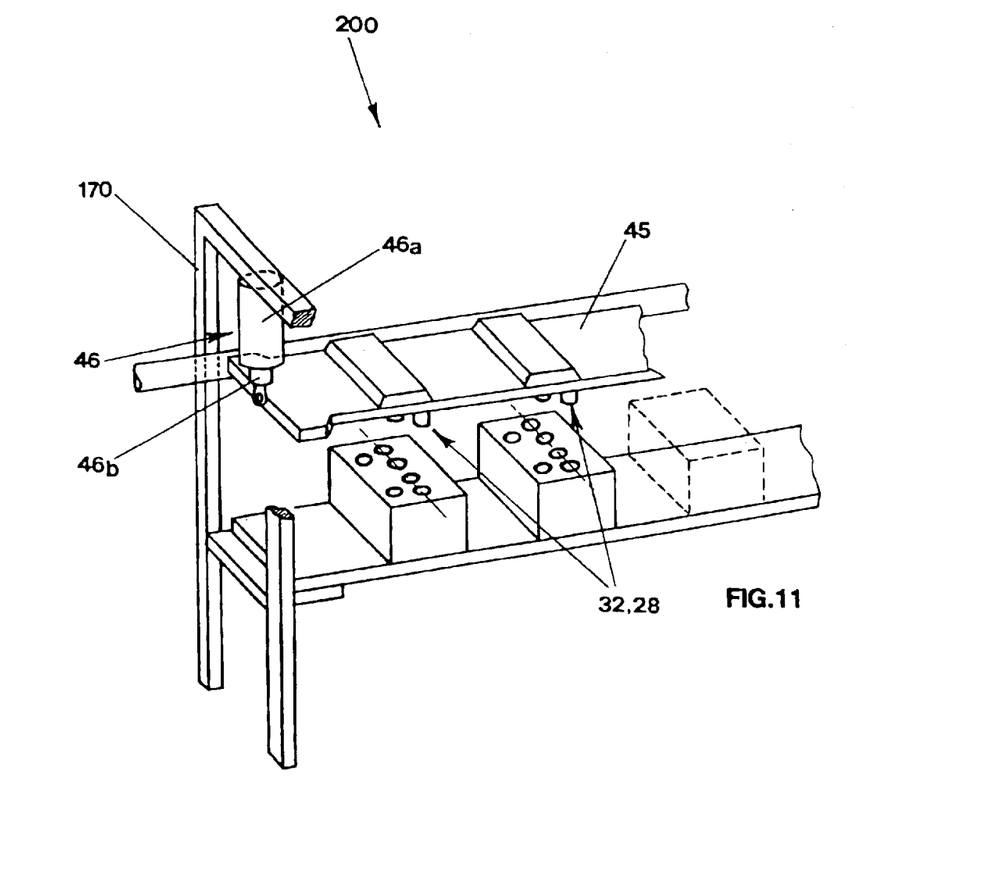
FIG. 11 represents a further variant application of the installation of FIG. 1.

In a further variant application, represented in detail in FIG. 11 and indicated at 170, the filling element 32 and each removable connector 28 are integral with a bearing element 45 developed longitudinally and supported at its ends by actuators, comprise for example a pair of pneumatic jacks 46 fixed to the support structure 170. In particular, each pneumatic jack 46, controlled by the intelligent control unit, has the cylinder 46a fixed to the support structure 170 and the rod 46b hinged to the bearing element 45.

From an operational point of view, once the accumulators A to be formed have been positioned on the manufacturing station, the control unit operates the jacks 46 and moves the bearing element 45 in a substantially vertical direction, until each filling clement 32 is connected to each electrolyte filling hole and each removable connector 28 is connected to each pole.

Even though the invention has been described with reference to the enclosed drawings, upon implementation changes may be made that are all included in the inventive concepts expressed in the following claims.

What is claimed is:

1. An Accumulator manufacturing installation, comprising:
   a plurality of pallets, each one suitable for supporting a plurality of accumulators aligned side by side;
   at least one loading station for loading said accumulators to be manufactured onto a pallet;
   at least one unloading station for collection of the accumulators from the respective pallet at the end of the manufacturing process;
   power supply means for the accumulators;
   electrolyte feeding means for the accumulators;
   a casing provided with a number of projecting supports positioned side by side and aligned in the vertical direction, suitable for supporting said pallets located on a substantially horizontal position one on top of the other, in such way as to create a corresponding number of forming stations for the accumulators as the number of projecting supports; and
   handling means for moving said pallets among said loading and unloading stations and said forming stations.

2. Installation according to claim 1, wherein in each one of said pallets, said power supply means and said electrolyte feeding means are positioned below an ideal line along which each pallet is suspended from said projecting supports and from said handling means.

3. Installation according to claim 1, wherein said handling means comprise travel means provided with first powering means and first kinematic units provided in turn with first coupling means suitable for mating to second coupling means present on said pallets in order to move said pallets horizontally.

4. Installation according to claim 3, wherein said handling means comprise lifting means provided with second powering means and second kinematic units to move said pallets in vertical direction.

5. Installation according to claim 1, wherein said pallets are vertically spaced from one another of a distance that cannot be shorter than the height of the accumulators supported by each of them.

6. Installation according to claim 1, wherein said pallets are provided with sliding means to make it easier to push said pallets away from/onto said handling means, onto/away from said loading/unloading stations and onto/away from said projecting supports.

7. Installation according to claim 6, wherein said handling means, said loading/unloading stations and said projecting supports are provided with sliding means to make it easier to push said pallets away from/onto said handling means, onto/away from said loading/unloading stations and onto/away from said projecting supports.

8. Installation according to claim 7, wherein said sliding means comprise a plane with idle balls or idle rollers.

9. Installation according to claim 1, wherein said power supply means comprise at least one connector cable integral with each pallet, connected to a power unit by means of a flexible pipe and provided with a plurality of electric terminals with removable connectors for connection to the corresponding poles of each one of said accumulators.

10. Installation according to claim 9, wherein said removable connectors connect said accumulators in series.

11. Installation according to claim 9, wherein said removable connectors connect said accumulators in parallel.

12. Installation according to claim 9, wherein the electrolyte feeding means comprises at least one feeding manifold and at least one electrolyte return manifold, each one integral with each pallet, and connected to a releasing/retrieving unit by means of the same number of flexible pipers, said manifolds being connected to at least one filling element removably connected to one or more filling holes of each accumulator.

13. Installation according to claim 1, wherein each one of said pallets comprises at least one support surface, with mainly longitudinal development, for said accumulators to be formed, and at least one bearing structure developed longitudinally with respect to said support surface to support said electric terminals and said feed and return manifolds.

14. Installation according to claim 13, wherein said bearing structure comprises actuators for the automatic connection of said electric terminals to said at least one accumulator.

15. Installation according to claim 1, wherein it comprises suction means for the elimination of the gates developed in each one of said accumulators during the charging phase.

16. Installation according to claim 15, wherein said suction means comprise at least one aspirator positioned above said casing.

17. Installation according to claim 12, wherein each one of said electrical cables, of said feed and return pipes and of said flexible pipes is supported by a corresponding releasing/retrieving unit.

18. Installation according to claim 1, further comprising:
   a plurality of panels arranged along the perimeter of said casing to delimit the volume of said installation.

19. Installation according to claim 1, further including a fire fighting system.

* * * * *